United States Patent [19]
Porter

[11] 3,889,720
[45] June 17, 1975

[54] HEALD MACHINE
[75] Inventor: Allan William Henry Porter, Lustmuhle, Switzerland
[73] Assignee: Aktiengesellschaft Adolph Saurer, Switzerland
[22] Filed: Jan. 24, 1974
[21] Appl. No.: 436,388

[30] Foreign Application Priority Data
Jan. 25, 1973 Switzerland.................... 1053/73

[52] U.S. Cl................................ 139/66 R; 139/79
[51] Int. Cl.².... D03C 1/00; D03C 1/12; D03C 5/00
[58] Field of Search.... 139/66 R, 55, 57, 58, 76–81, 139/66 A

[56] References Cited
UNITED STATES PATENTS

| 2,687,148 | 8/1954 | Pfarrwaller ...................... 139/79 X |
| 3,228,427 | 1/1966 | Honegger........................ 139/66 R |
| 3,807,460 | 4/1974 | Alexandr et al. ..................... 139/76 |

FOREIGN PATENTS OR APPLICATIONS

| 568,193 | 3/1945 | United Kingdom.................. 139/79 |
| 1,296,090 | 5/1961 | France .................................. 139/55 |
| 1,285,417 | 12/1968 | Germany............................ 139/66 R |

*Primary Examiner*—James Kee Chi
*Attorney, Agent, or Firm*—McGlew and Tuttle

[57] ABSTRACT

A loom dobby, for use in a loom having heald shafts, has a fixed support shaft carrying a plurality of axially adjacent sun gears rotatable thereon. A support cage is fixed to the loom and a planet carrier is oscillatably mounted on the support cage and rotatably mounts planet gears in sets each respective to a particular sun gear. A respective ring gear meshes with each set of sun gears and is mounted for free rotation. Each ring gear is in the form of a disc cam whose outer periphery is formed with two cam surfaces which are axially adjacent each other. An oscillatable arm is associated with each disc cam and carries two cam followers in the form of rollers, each roller engaging a respective cam track on the associated disc cam. A free end of the lever mounting the cam follower rollers is connected, by suitable means, to a respective heald shaft. An arm is secured to the planet carrier and is oscillated by suitable means such as a tappet chain or an eccentric groove in a disc. Hydraulically, electrically, or otherwise operated plungers are mounted in the support cage for reciprocation between a first position, in which they engage and lock an associated sun gear, and a second position, in which they engage and lock the associated ring gear. The engagement and locking of the associated sun gear as well as the engagement and locking of the associated ring gear occur at substantially the same time as the oscillatory motion of the planet carrier is reversed.

6 Claims, 6 Drawing Figures

HEALD MACHINE

FIELD AND BACKGROUND OF THE INVENTION

This invention relates to a loom dobby in which motions of heald shafts are produced by oscillatory motion of drive members arranged such that the oscillatory motion of the drive members imparts a substantially reciprocatory motion to the respective heald shafts.

Hattersley dobbies have two rectilinearly guided draw beams which are connected to the drive member on either side of its axis of oscillation, so that the draw beams reciprocate in respective opposite directions. Draw hooks, connected to respective ends of a baulk lever, can be hooked onto the draw beams so that the baulk lever, whose center is connected to a respective heald shaft, actuates the heald shaft in accordance with the motion of the drive member and also in dependence on the connection or disconnection of the respective draw hooks with the draw beam. Such dobbies require considerable space and incorporate a relatively large number of transmission and control elements, because two draw hooks are required for each heald shaft and, in addition, a complicated mechanism is required to eliminate the effect, on the heald shaft, of the clearance or play which is essential for the engagement and disengagement of the draw hooks relative to the draw beams. This play otherwise would cause irregular shedding. During each stroke, one end of the baulk lever remains stationary be engaging a stop, and considerable noise is caused by the baulk lever striking its stops and by the engagement of the draw hooks with the draw beams.

Swiss Patent Specification No. 511,958 discloses a dobby which avoids the use of draw hooks, by actuating a heald shaft using a rotating cam, a cam follower and levers connected to the heald shaft. The rotating cam is formed on the ring gear of an epicyclic mechanism whose ring gear is rotated at constant speed, and the movement of the heald shaft is controlled by means of pawls which engage in recesses in the ring gear or the planed carrier. This engagement suddenly arrests the moving masses and causes noise and also very high stresses, particularly on the planet carrier to which the large mass of the heald shaft is mechanically linked. Furthermore, the engagement occurs at the moment of greatest acceleration of the shaft, that is, when the heald shaft is in the upper or the lower shedding position. Additionally, alterations in the substantially sinusoidal movement of the heald shafts require a further rotary movement to be superposed on the constant speed rotation of the ring gear. This is effected in an expensive manner by pivoting the single pawl or each pawl on a lever which, in turn, is pivoted about the axis of the epicyclic mechanism, and by controlling the angle of the lever or its speed of pivoting by a rotating cam track.

SUMMARY OF THE INVENTION

In accordance with the invention, there is provided a dobby comprising a planet carrier mounted for oscillatory motion, means for imparting an oscillatory motion to the planet carrier, at least one planet gear rotatably mounted on the planet carrier, a sun gear meshing with each planet gear, and a ring gear meshing with the planet gears and mounted for free rotation. The ring gear is arranged so that oscillatory motion thereof imparts a substantially reciprocatory motion to a respective heald shaft. Preferably, the means oscillating the planet carrier is a lever connected thereto and arranged to be driven with an oscillatory motion, and the ring gear preferably is formed as a cam disc with cam follower means being provided for imparting the substantially oscillatory motion of the ring gear to the heald shaft as the cam disc oscillates.

A dobby embodying the invention can be simple, with relatively few transmission elements, and can be arranged to operate relatively quietly. Thus, each sun gear is mounted for oscillatory motion and means are provided for holding either the ring gear or the associated sun gear stationary, at will, at least approximately at the same time as the planet carrier reverses its oscillatory motion. Only a single moving control element is required for holding each heald shaft stationary and setting it in motion again, thus reducing the chances of errors occurring in the control of the heald shafts.

The locking device for selectively holding either the ring gear or the sun gear stationary may be mounted in a stationary member provided between each sun gear and the associated ring gear. Preferably, the locking device is a radially slidable bolt having one end arranged to fit between adjacent teeth of the associated ring gear and the other end arranged to fit between adjacent teeth of the associated sun gear. The bolts may be hydraulically displaced between their two end positions.

An object of the invention is to provide an improved loom dobby for use in a loom having heald shafts.

Another object of the invention is to provide such a loom dobby which is simple in construction, with relatively few transmission elements, and which can operate relatively quietly.

A further object of the invention is to provide such a loom dobby in which only a single moving control element is required to hold each heald shaft stationary and to set the same in motion again, thus reducing the chances of errors occurring in the control of the heald shafts.

For an understanding of the principles of the invention, reference is made to the following description of a typical embodiment thereof as illustrated in the accompanying drawings.

DESCRIPTION OF THE PREFERRED EMBODIMENT

Figure 1:
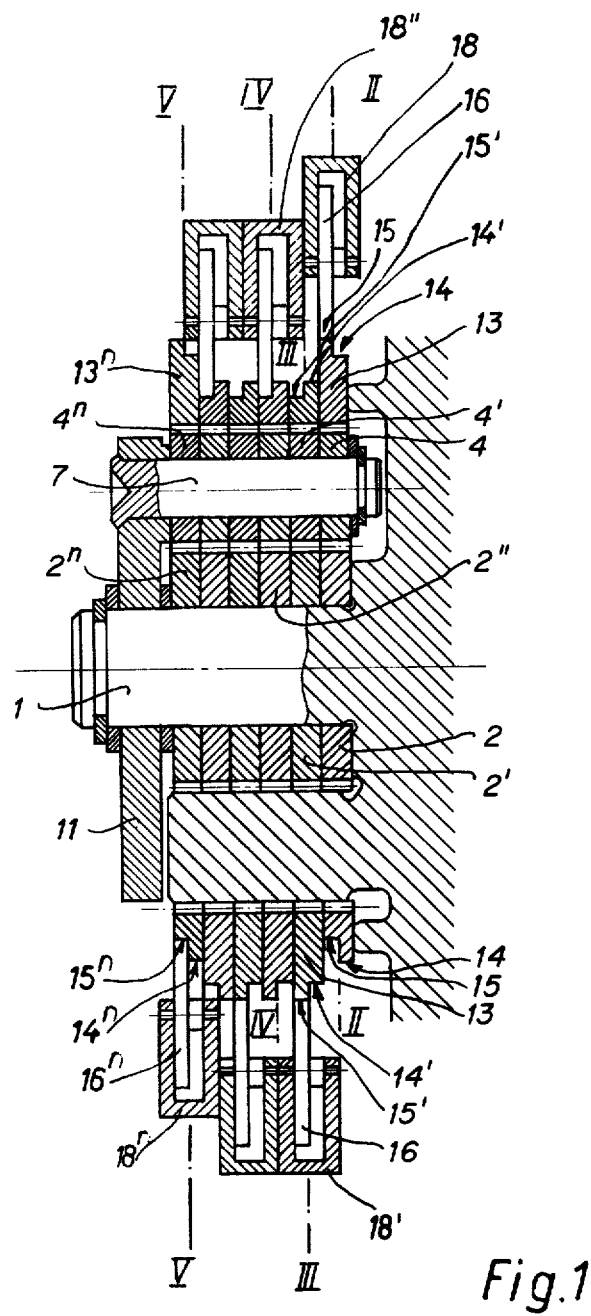
FIG. 1 is a longitudinal sectional view, along the plane A-B-C-D-E-F of FIGS. 2 through 5, and illustrating part of a dobby embodying the invention.
Figure 2:
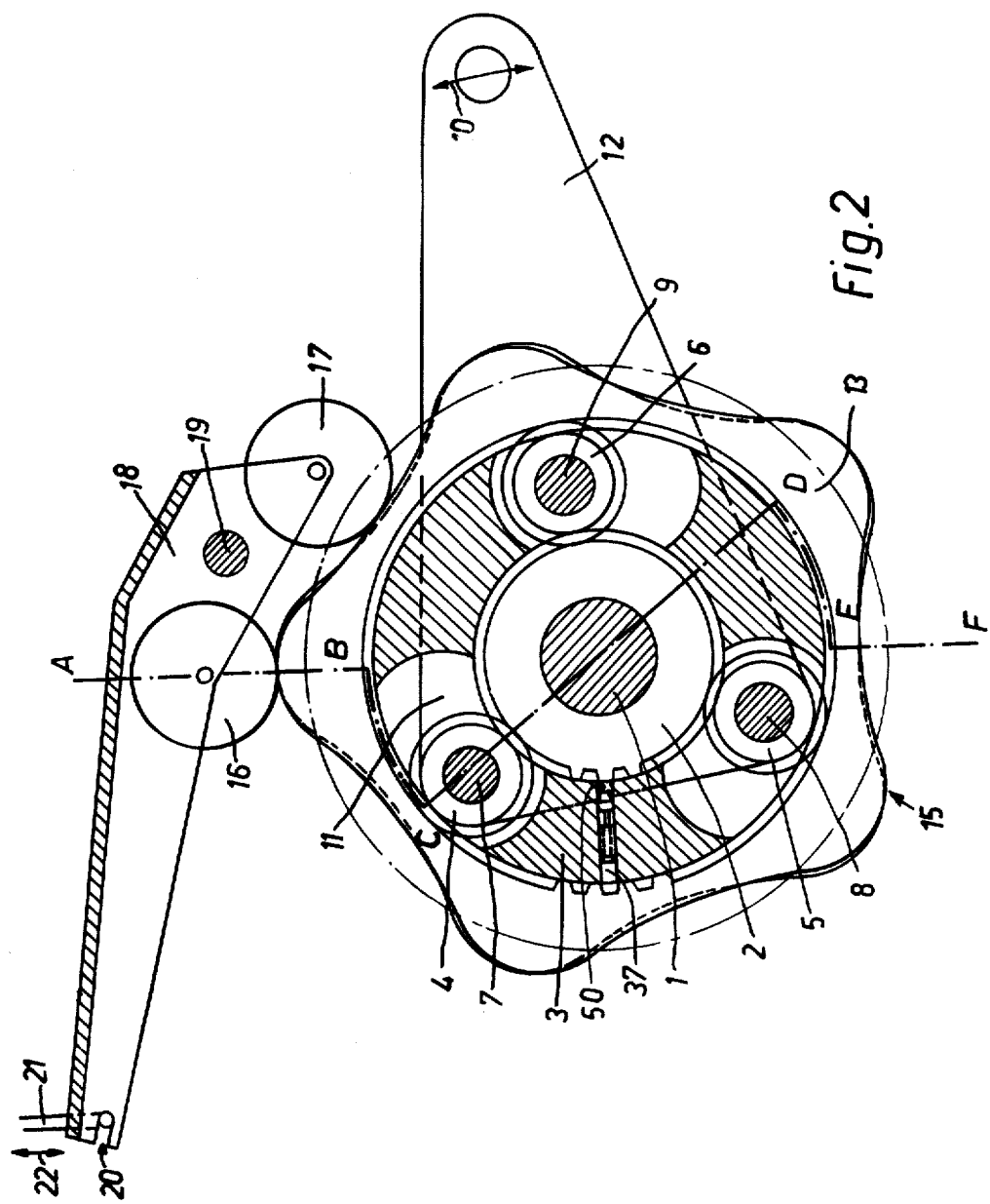
FIG. 2 is a transverse sectional view taken on the line II—II of FIG. 1.
Figure 3:
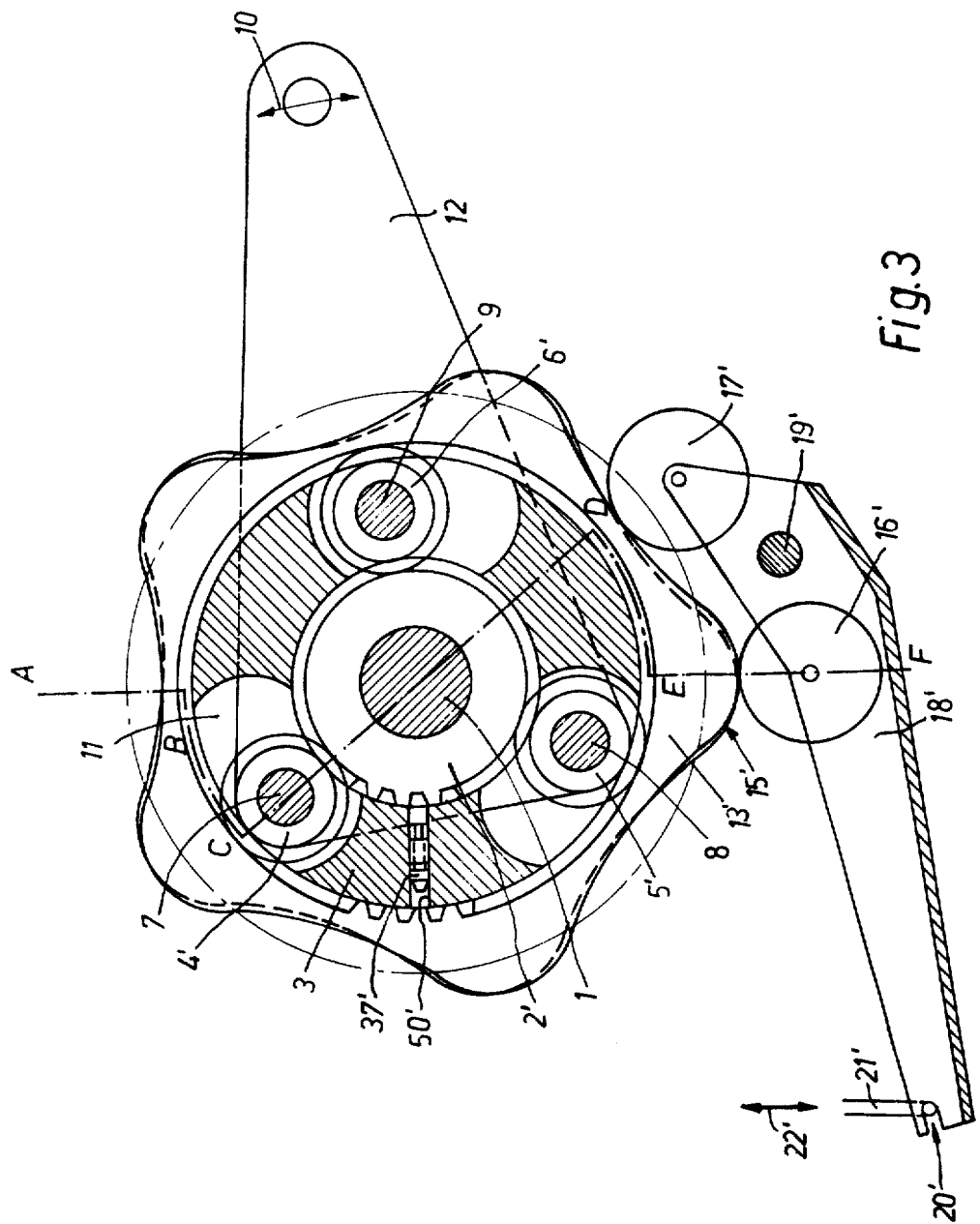
FIG. 3 is a transverse sectional view taken on the line III—III of FIG. 1.
Figure 4:
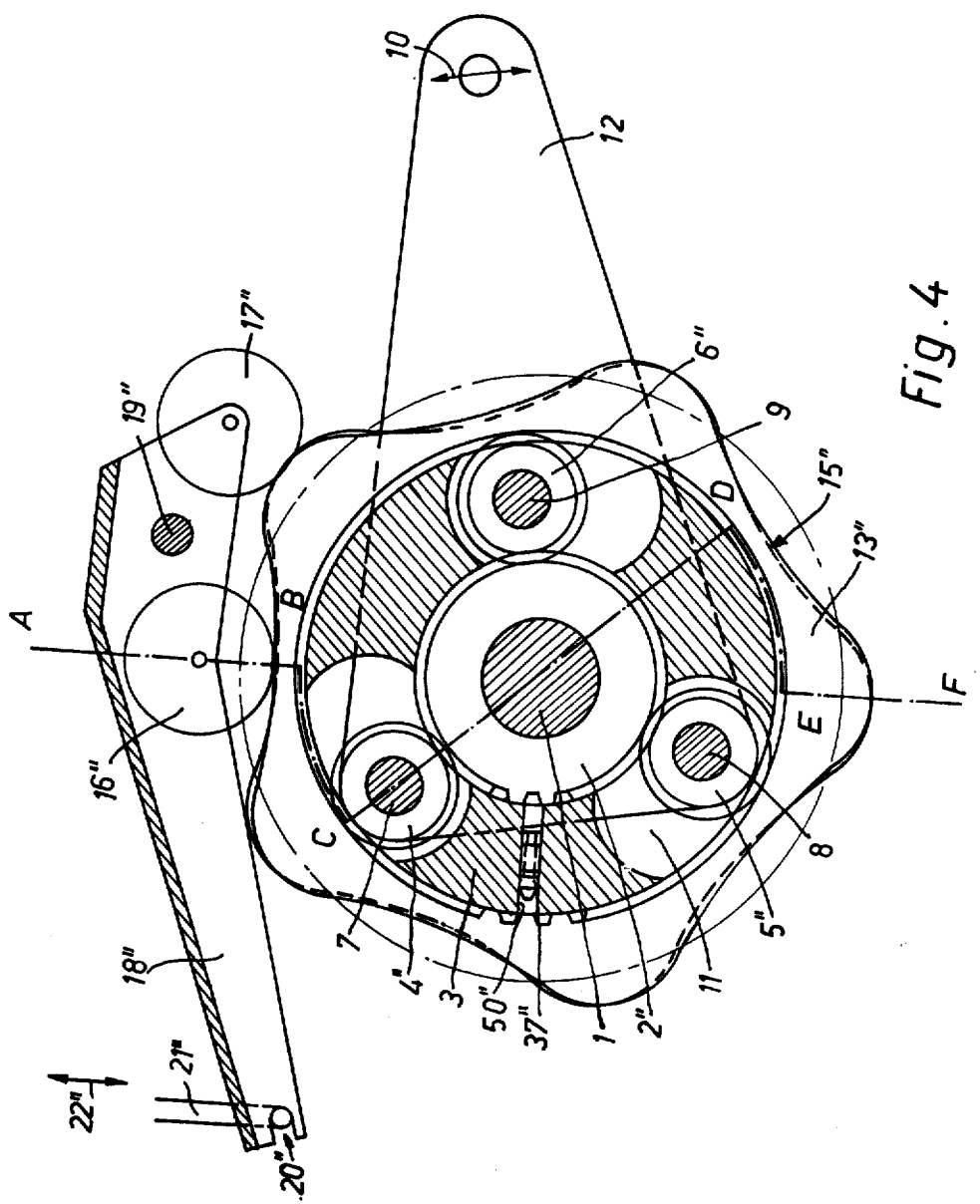
FIG. 4 is a transverse sectional view taken on the line IV—IV of FIG. 1.
Figure 5:
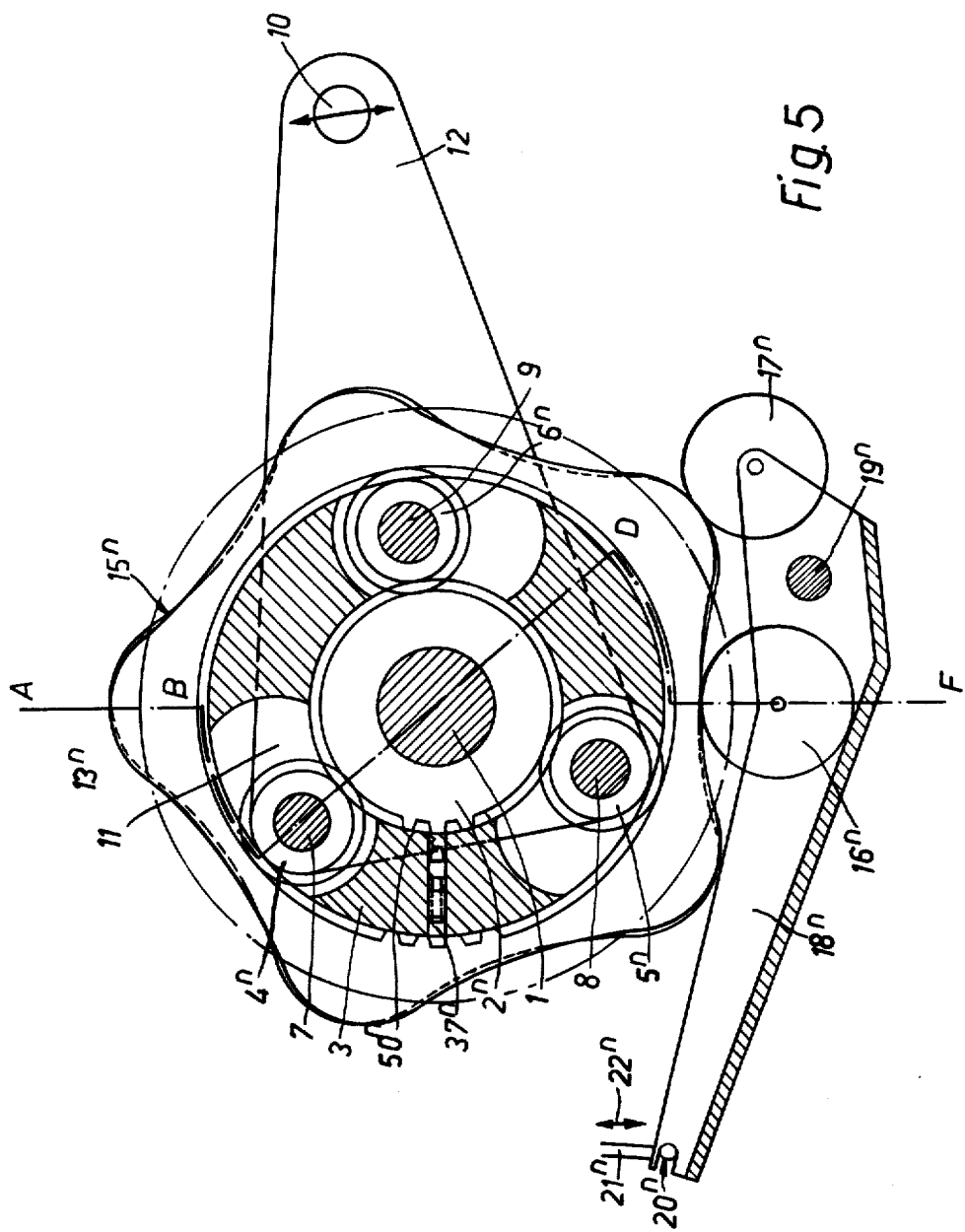
FIG. 5 is a transverse sectional view along the line V—V of FIG. 1.

Referring to the drawings, a support shaft 1 is fixed to the loom by means of elements, which have not been shown, such as flanges or support arms. Spur gears 2, 2', 2'' ..... 2ⁿ, hereinafter referred to as sun gears, are rotatably mounted on support shaft 1 in axially adjacent relation. The sun gears are disposed in the interior of a support cage or stationary member 3 which is fixed to the loom and has three axially-extending support bars, in angularly spaced relation, as best seen in FIGS. 2 through 5. The sun gears mesh with respective planet gears 4, 4', 4'' ..... 4$^n$, mounted on a shaft 7, respective planet gears 5, 5', 5'' ..... 5$^n$, mounted on a shaft 8, and respective planet gears 6, 6', 6'' ..... 6$^n$ mounted on a shaft 9. Shafts 7, 8 and 9 are secured in fixed relation to a planet carrier 11, which is coaxial with shaft 1 and can be oscillated about the axis of shaft 1 by a drive arm 12, best seen in FIGS. 2 through 6, which is oscillatable or movable in the direction of the double arrow 10 by means of a suitable device, which has not been shown, such as an eccentric or a grooved disc.

The planet gears also mesh with respective internal ring gears constituting disc cams 13, 13', 13'' ..... 13$^n$, each disc cam having five cam lobes. The disc cams are centered by engagement of the tips of their internal teeth with circular external surfaces of the axially extending bars of support cage 3. The external periphery of each disc cam is formed with two respective adjacent cam tracks 14 and 15 14' and 15', ..... 14$^n$ and 15$^n$, each engaged by respective separate rollers 16 and 17, 16' and 17', ..... 16$^n$ and 17$^n$, the rollers rolling along the respective cam tracks and being rotatably mounted on respective double roller levers 18, 18' ..... 18$^n$. The rollers of each pair are axially offset, with respect to each other, by the amount of offset between the two axially adjacent associated cam tracks.

Each double roller lever is pivotable about a respective shaft 19, 19' ..... 19$^n$ between the two rollers rotatably mounted thereon, these shafts being fixed to the loom. One end of each double roller lever has connecting means 20, 20' ..... 20$^n$ for a respective connecting rod 21, 21' ..... 21$^n$ which extends to an associated heald shaft, which has not been shown. The double roller levers can all be disposed on the same side of the disc cams, in which case, they can be oscillatably mounted on a single common shaft 19. However, in order to provide a dobby having a short length, the double roller levers preferably are disposed alternately on diametrically opposite sides of the disc cams. In this case, all those double roller levers disposed on the same side of the disc cams can be appropriately oscillatably mounted on a single shaft.

Figure 6:
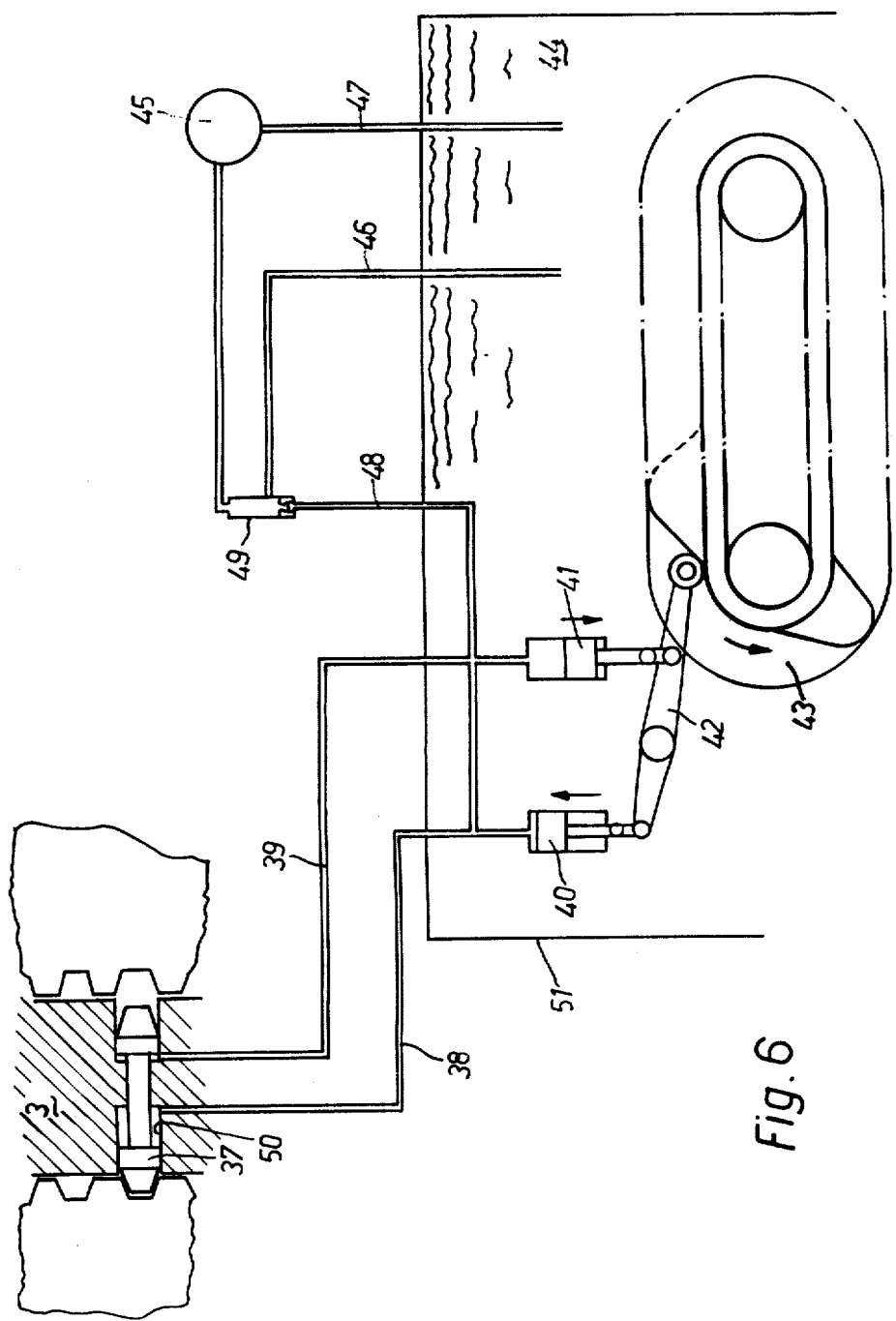
FIG. 6 is a schematic illustration of a hydraulic control circuit for a dobby embodying the invention.

Longitudinally slidable locking bolts 37, 37' ..... 37$^n$ are disposed in respective radial bores 50, 50' ..... 50$^n$ in support cage or stationary member 3, at least approximately in the medium planes of the respective sun wheels. The radial bores are stepped, so as to have a smaller diameter in their central portions than at their end portions, and each bolt has two large diameter piston ends in respective large diameter end portions of the associated bores, as best seen in FIG. 6. The opposite ends of each bolt are so formed that they are able to penetrate into a tooth gap of the associated disc cam, such as 13, or of the associated sun wheel, such as 2. Hydraulic control systems, such as, for example, the control system illustrated in FIG. 6, may be used to slide the bolts between their two end positions.

Referring to FIG. 6, the illustrated hydraulic control system comprises a pump 45 drawing hydraulic fluid 44 through a suction line 47 from a reservoir 51, and delivering hydraulic fluid under pressure to two ducts 38 and 39 through a non-return valve 49 and a delivery line 48. Excess fluid delivered by pump 45 is returned into reservoir 51 through an overflow duct 46. Each duct 38 or 39 is connected to a respective cylinder 40 or 41, in each of which a piston is actuated by a separate arm of a pivoting lever 42. Lever 42 may be pivoted or oscillated by any suitable mechanism, for example a tappet chain 43, as shown, or a device which is controlled by punched cards.

The other end of each duct 38 or 39 is connected to a respective large diameter end portion of a bore 50 in which the piston ends of bolts 37 are adapted to slide. Each bolt, which is actuated by the hydraulic fluid, follows each movement of the associated lever 42, and thus locks either the respective sun gear 2 or the respective disc cam 13, etc., each disc cam being connected with the sun gear through the associated set of planet gears. The length of each bolt 47 does not exceed the radial thickness of the bars of support cage or stationary member 3, so that simultaneous arresting of the associated sun gear and the associated disc cam is avoided.

The illustrated dobby operates in a manner which will now be described. If the position of the heald shaft actuated by a connecting rod 21 is to be changed after each pick, the associated sun gear 2 is locked by the bolt 37. The disc cam 13 oscillates about support shaft 1 in synchronism with the motion of planet carrier 11, and with an amplitude which is defined by the angular motion of the planet carrier 11 and the transmission between the associated sun gear 2 and the associated disc cam 13. At one reversing point of the oscillatory motion of the disc cam 13, one roller, 16 or 17, is in a trough of the associated cam surface and the other roller is at a tip of the associated cam surface, the positions of the rollers being interchanged at other reversing points.

However, if the heald shaft is to remain in the upper shed position or in the lower shed position, disc cam 13 is locked, in the appropriate position of double roller lever 18, by sliding bolt 37 radially outwardly, whereupon sun gear 2 will oscillate idly on shaft 1.

It must be possible to release disc cam 13 and lock sun wheel 2 at either reversing point of the oscillatory motion of planet carrier 11. The cam tracks on the disc cams therefore have a symmetrical contour, so that the disc cams can be operated in both directions of oscillation. The amplitude of the oscillatory motion of each disc cam is designed so that an entire series of cams can be accommodated on the circumference of the disc.

It should be noted that shedding is effected by displacement of only a single element, namely a bolt 37, and does not require selection between two lifters or draw hooks, such as in Hattersley dobbies and other dobbies. This greatly simplifies control. The other heald shafts are actuated in a similar manner. The coupling between the double roller levers, such as lever 18, and the associated heald shafts, need not be as direct as indicated above, but may, for example, take the form of a multi-link system with parallel guiding action.

While a specific embodiment of the invention has been shown and described in detail to illustrate the application of the principles of the invention, it will be understood that the invention may be embodied otherwise without departing from such principles.

What is claimed is:

1. A loom dobby, for use in a loom having heald shafts, comprising, in combination, plural planetary gearings; a planet carrier; means mounting said planet carrier for oscillatory motion; means connected to said planet carrier and operable to impart oscillatory motion thereto; at least one planet gear shaft secured on said planet carrier; each planetary gearing including a respective planet gear mounted for free rotation on said planet gear shaft, a respective sun gear meshing with the associated planet gear, and a respective ring gear meshing with the associated planet gear; means mounting each sun gear and ring gear for free rotation; respective holding means operatively associated with each sun gear and its associated ring gear and selectively operable to hold one of the associated sun gear and ring gear stationary at least substantially at the same time as the direction of motion of said planet carrier is reversed; and means operatively engaged with each ring gear and operable, responsive to oscillatory motion of the associated ring gear, to impart a substantially reciprocatory motion to a respective heald shaft.

2. A loom dobby, as claimed in claim 1, in which the means for imparting an oscillatory motion to said planet carrier comprises a lever connected to said planet carrier; means operable to drive said lever with an oscillatory motion; each ring gear being formed as a cam disc; said means operable to impart a substantially reciprocatory motion to a respective heald shaft comprising a respective cam follower engaged with each cam disc and operable to impart the substantially oscillatory motion of the cam disc to the respective heald shaft.

3. A loom dobby, as claimed in claim 1, including a stationary member provided between each sun gear and the associated ring gear; said holding means comprising a locking device mounted in said stationary member and operable to hold either the associated ring gear or the associated sun gear stationary.

4. A loom dobby, as claimed in claim 3, in which said locking device is a bolt radially slidable in said stationary member and having one end arranged to engage between adjacent teeth of the associated ring gear and the other end arranged to engage between adjacent teeth of the associated sun gear.

5. A loom dobby, as claimed in claim 4, including fluid pressure means operable to reciprocate each radially slidable bolt between its two locking positions.

6. A loom dobby, as claimed in claim 2, in which the periphery of each cam disc is formed with a cam track; said cam follower comprising a rocking lever having roller means engaged with said cam track and arranged to rock said lever.

* * * * *